US010825249B2

(12) United States Patent
Jouet et al.

(10) Patent No.: US 10,825,249 B2
(45) Date of Patent: Nov. 3, 2020

(54) METHOD AND DEVICE FOR BLURRING A VIRTUAL OBJECT IN A VIDEO

(71) Applicant: INTERDIGITAL CE PATENT HOLDINGS, Paris (FR)

(72) Inventors: Pierrick Jouet, Rennes (FR); Philippe Robert, Rennes (FR); Matthieu Fradet, Chanteloup (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 50 days.

(21) Appl. No.: 15/704,757

(22) Filed: Sep. 14, 2017

(65) Prior Publication Data
US 2018/0075660 A1   Mar. 15, 2018

(30) Foreign Application Priority Data

Sep. 15, 2016 (EP) .................... 16306175

(51) Int. Cl.
| G06T 19/00 | (2011.01) |
| G06T 7/246 | (2017.01) |
| G06T 7/73 | (2017.01) |
| G06T 5/00 | (2006.01) |
| G01P 13/00 | (2006.01) |
| G01P 15/14 | (2013.01) |

(Continued)

(52) U.S. Cl.
CPC .......... *G06T 19/006* (2013.01); *G01P 13/00* (2013.01); *G01P 15/14* (2013.01); *G06T 5/002* (2013.01); *G06T 5/20* (2013.01); *G06T 7/246* (2017.01); *G06T 7/73* (2017.01); *G06T 11/00* (2013.01); *G06T 2207/10016* (2013.01); *G06T 2207/10024* (2013.01); *G06T 2207/30241* (2013.01); *G06T 2207/30244* (2013.01)

(58) Field of Classification Search
None
See application file for complete search history.

(56) References Cited

U.S. PATENT DOCUMENTS

| 8,018,579 B1* | 9/2011 | Krah ................ G01B 11/00 356/4.01 |
| 9,106,873 B2 | 8/2015 | Pandey et al. |
| 2006/0279639 A1 | 12/2006 | Silverstein et al. |

(Continued)

FOREIGN PATENT DOCUMENTS

| EP | 2819095 | 12/2014 |
| WO | WO2013173670 | 11/2013 |
| WO | WO201637653 | 9/2016 |

OTHER PUBLICATIONS

Klein et al., "Compositing for Small Cameras", IEEE International Conference on Mixed and Augmented Reality, Cambridge, United Kingdom, Sep. 15, 2008, pp. 57-60.

(Continued)

*Primary Examiner* — Steven Z Elbinger
(74) *Attorney, Agent, or Firm* — Invention Mine LLC (57) ABSTRACT

In order to blur a virtual object in a video in real time as the video is acquired by a device capturing a real scene, a salient idea is used which estimates an apparent motion vector between two successive images, being captured at two successive device poses, in which the apparent motion vector estimation is based on a motion of the device. The successive images are then filtered based on the estimated apparent motion vector.

26 Claims, 4 Drawing Sheets

(51) Int. Cl.
*G06T 5/20* (2006.01)
*G06T 11/00* (2006.01)

(56) References Cited

U.S. PATENT DOCUMENTS

| | | | | |
|---|---|---|---|---|
| 2008/0143840 | A1* | 6/2008 | Corkum | H04N 5/23248 348/208.6 |
| 2009/0237563 | A1* | 9/2009 | Doser | G09G 5/00 348/579 |
| 2011/0304639 | A1* | 12/2011 | Noge | G06T 15/04 345/584 |
| 2012/0129605 | A1* | 5/2012 | Livet | G06K 9/00355 463/39 |
| 2014/0325547 | A1 | 10/2014 | Roberts et al. | |
| 2014/0333669 | A1* | 11/2014 | Stich | G06T 5/002 345/634 |
| 2015/0003676 | A1* | 1/2015 | Kuchiki | G06T 7/254 382/103 |
| 2015/0109337 | A1* | 4/2015 | Hofmann | G06T 7/0002 345/633 |
| 2015/0178898 | A1* | 6/2015 | Routhier | G06T 13/80 345/620 |
| 2015/0220996 | A1 | 8/2015 | Bhamidipati et al. | |
| 2015/0245020 | A1* | 8/2015 | Meier | G06T 7/73 348/135 |
| 2016/0253819 | A1* | 9/2016 | Mendez Mendez | G06T 13/80 382/197 |
| 2016/0364867 | A1* | 12/2016 | Moteki | G06T 7/73 |
| 2017/0055842 | A1* | 3/2017 | Umezawa | A61B 5/0095 |
| 2017/0069107 | A1* | 3/2017 | Kobayashi | G06T 19/006 |
| 2017/0236288 | A1* | 8/2017 | Sundaresan | G06T 7/20 382/173 |

OTHER PUBLICATIONS

Park et al., "Handling Motion-Blur in 3D Tracking and Rendering for Augmented Reality", IEEE Transactions on Visualization and Computer Graphic, vol. 18, No. 9, Sep. 2012, pp. 1449-1459.

Lin et al., "Photo-Consistent Motion Blur Modeling for Realistic Image Synthesis", Advances in Image and Video Technology, Lecture Notes in Computer Science, LNCS 4319, Jan. 2006, pp. 1273-1282.

Chakrabarti et al., "Analyzing Spatially-varying Blur", IEEE Computer Society Conference on Computer Vision and Pattern Recognition (CVPR), San Francisco, California, USA, Jun. 13, 2010, pp. 1-8.

Bae et al., "Accurate Motion Deblurring using Camera Motion Tracking and Scene Depth", 2013 IEEE Workshop on Applications of Computer Vision (WACV), Clearwater, Florida, USA Jan. 15, 2013, pp. 1-6.

Fischer et al., "Enhanced Visual Realism by Incorporating Camera Image Effects", IEEE/ACM International Symposium on Mixed and Augmented Reality, ISMAR 2006, Santa Barbard, California, USA, Oct. 22, 2006, pp. 1-13.

Joshi et al., "Image Deblurring using Inertial Measurement Sensors", ACM Transactions on Graphics, vol. 29, Jul. 2010, pp. 1-8.

Lobo et al., "Relative Pose Calibration Between Visual and Inertial Sensors", The International Journal of Robotics Research, vol. 26, No. 6, Jun. 2007, pp. 1-6.

Park et al., "Handling Motion-Blur in 3D Tracking and Rendering for Augmented Reality", Journal of Latex Class Files, vol. 6, No. 1, Jan. 2007, pp. 1-12.

Ligorio et al., Extended Kalman Filter-Based Methods for Pose Estimation Using Visual, Inertial and Magnetic Sensors: Comparative Analysis and Performance Evaluation, Sensors, vol. 13, Feb. 4, 2013, pp. 1919-1941.

Lee et al., "Video-Based in Situ Tagging on Mobile Phones", IEEE Transactions on Circuits and Systems for Video Technology, vol. 21, No. 10, Oct. 2011, pp. 1487-1496.

Lee et al., "Point-and-Shoot for Ubiquitous Tagging on Mobile Phones", 2010 IEEE International Symposium on Mixed and Augmented Reality, Seoul, South Korea, Oct. 13, 2010, pp. 1-8.

Bohn, D., "Skype lets you add Muppet videos to your chats with 'Moji'", The Verge, http://www.theverge.com/2015/9/15/9330237/skype-moji-muppets-emoji . . . /, Sep. 15, 2015, p. 1.

Jahns, J., "X Men: Apocalypse Trailer Review", https://www.youtube.com/watch?v=OPAm850A-WU, Dec. 22, 2015, pp. 1-6.

Van, L. N., "InstaVideo—Add Music to Videos, Text Watermark & Emoji for Instagram & Vine", https://itunes.apple.com/us/app/instavideo-add-music-to-videos/id69941 . . . /, Aug. 29, 2015, pp. 1-2.

* cited by examiner

METHOD AND DEVICE FOR BLURRING A VIRTUAL OBJECT IN A VIDEO

REFERENCE TO RELATED EUROPEAN APPLICATION

This application claims priority from European Patent Application No. 16306175.7, entitled "METHOD AND DEVICE FOR BLURRING A VIRTUAL OBJECT IN A VIDEO", filed on Sep. 15, 2016, the contents of which are hereby incorporated by reference in its entirety.

TECHNICAL FIELD

The technical field of the disclosed method, device and system is related to augmented reality where virtual objects are inserted in video during the video acquisition.

BACKGROUND ART

One aspect of augmented reality is the compositing of a real scene with virtual objects in videos. When a video is captured from fast moving real objects, the resulting video generally comprises a so-called motion blur. In case of video acquired from real scenes, motion blur of real objects is naturally captured by the camera. In case of animated films, a motion blur is computationally created from the movement of the animated objects. In case of augmented reality applications, mixing both real scenes and virtual objects, some methods are known for blurring virtual objects inserted in an already acquired video as part of a post-production and are generally computationally intensive. The blurring is for instance obtained from a knowledge of the motion of the virtual object, or from motion detected in the video from image processing techniques. However, in case a video is acquired by a moving device, and a virtual object is inserted in that video by the capturing device, there is no known method, directly applicable to the capturing device, for blurring virtual objects inserted in a video. The resulting video will lack of realism as the virtual object will be too sharp in a blurred video. Some new methods are needed for blurring in real time virtual objects inserted in a video acquired by a capturing device, so as to improve the results of augmented reality applications. Such new methods would enable a range of new augmented reality applications on mobile devices for instance.

SUMMARY

In order to blur a virtual object in a video in real time as the video is acquired by a device capturing a real scene, a salient idea comprises estimating an apparent motion vector between two successive images, being captured at two successive device poses, wherein the apparent motion vector estimation is based on a motion of the device. The successive images are then filtered based on the estimated apparent motion vector. To that end a method for blurring a virtual object in a video captured by a device from a scene is disclosed. The method is performed by the device and comprises:
- capturing an initial image of video;
- capturing a current image of the video;
- estimating an apparent motion vector of the virtual object between the initial image and the current image, based on a motion of the device;
- filtering at least a part of the current image based on the apparent motion vector (30).

According to a particularly advantageous variant, the device further comprises at least one motion sensor, the initial image is captured by the device at an initial device pose, the current image is captured by the device at a current device pose, and the motion of the device is obtained from data generated by the at least one motion sensor of the device, moving from the initial device pose to the current device pose.

According to another particularly advantageous variant, estimating the apparent motion vector further comprises estimating the current device pose, based on the initial device pose and on the motion of the device.

According to another particularly advantageous variant, the method further comprises estimating a current object location in the current image based on the apparent motion vector and on an initial object location in the initial image, the initial object location being associated with a vertex of the virtual object, the current object location being associated with the vertex.

According to another particularly advantageous variant the virtual object has a trajectory in the scene, the method further comprising:
- estimating a current object position based on the trajectory and an initial object position, the initial object position corresponding to a vertex of the virtual object, the current object position corresponding to the vertex, and
- estimating a current object location in the current image based on a projection of the current object position in the current image, the current object location being associated with the vertex.

According to another particularly advantageous variant, estimating the apparent motion vector of the virtual object is based on a difference between the current object location in the current image and an initial object location in the initial image, the initial object location being associated with the vertex.

According to another particularly advantageous variant, filtering further comprises determining a spatial filter length and a spatial filter direction, the spatial filter direction corresponding to a direction of the apparent motion vector, and the spatial filter length being a factor of a module of the apparent motion vector, the spatial filter length corresponding to a number of neighboring pixels.

According to another particularly advantageous variant, the factor corresponds to a shutter aperture duration of the device.

According to another particularly advantageous variant, filtering at least a part of the current image further comprises:
- obtaining a mask of the virtual object for the current image, wherein the mask comprises a non-null color value and a weight value of one for each pixel of the current image corresponding to the virtual object;
- spatially filtering the mask according to the determined spatial filter;
- blending the current image with the spatially filtered mask of the virtual object.

According to another particularly advantageous variant, the method further comprises estimating the initial device pose based on a preceding image being captured by the device at a preceding device pose, the estimating the initial device pose being further based on the preceding device pose and a preceding motion of the device from the preceding device pose to the initial device pose.

According to another particularly advantageous variant, the method further comprises:

inserting the virtual object in the initial image, from a user interface, the inserting comprising associating the vertex of the virtual object with the initial object location in the initial image;

estimating the initial device pose related to the initial object position corresponding to the initial object location.

In a second aspect, a device for capturing a video and blurring a virtual object in the video is also disclosed. The device comprises:

means for capturing an initial image of the video;

means for capturing a current image of the video;

means for estimating an apparent motion vector of the virtual object between the initial image and the current image, based on a motion of the device;

means for filtering at least a part of the current image based on the apparent motion vector.

In a third aspect, a device for capturing a video and blurring a virtual object in the video is also disclosed. The device comprises a camera configured to capture an initial image of the video;

capture a current image of the video;

the device further comprising at least one processor configured to:

estimate an apparent motion vector of the virtual object between the initial image and the current image, based on a motion of the device;

filter at least a part of the current image based on the apparent motion vector.

In a fourth aspect, a computer program for blurring a virtual object in a video captured from a scene is also disclosed. The computer program comprises program code instructions executable by at least one processor for:

capturing an initial image of the video;

capturing a current image of the video;

estimating an apparent motion vector of the virtual object between the initial image and the current image, based on a motion of the device;

filtering at least a part of the current image based on the apparent motion vector.

In a fifth aspect, the invention is directed to a computer-readable storage medium, storing program instructions computer-executable to perform the disclosed methods.

In a sixth aspect, the invention is directed to a computer program product comprising instructions of program code for execution by at least one processor to perform the disclosed methods.

While not explicitly described, the present embodiments may be employed in any combination or sub-combination. For example, the present principles are not limited to the described variants, and any arrangement of variants and embodiments can be used. Moreover, the present principles are not limited to the described image sampling and image/object initialization examples. The present principles are not further limited to the described pose estimation methods, and are applicable to any other kind of device pose estimation method. The present principles are not further limited to the described object trajectories.

Besides, any characteristic, variant or embodiment described for the method is compatible with a device intended to process the disclosed method, with a computer program comprising program code instructions executable by a processor to process the disclosed method and with a non-transitory computer-readable storage medium, storing program instructions.

DESCRIPTION OF EMBODIMENTS

Figure 1:
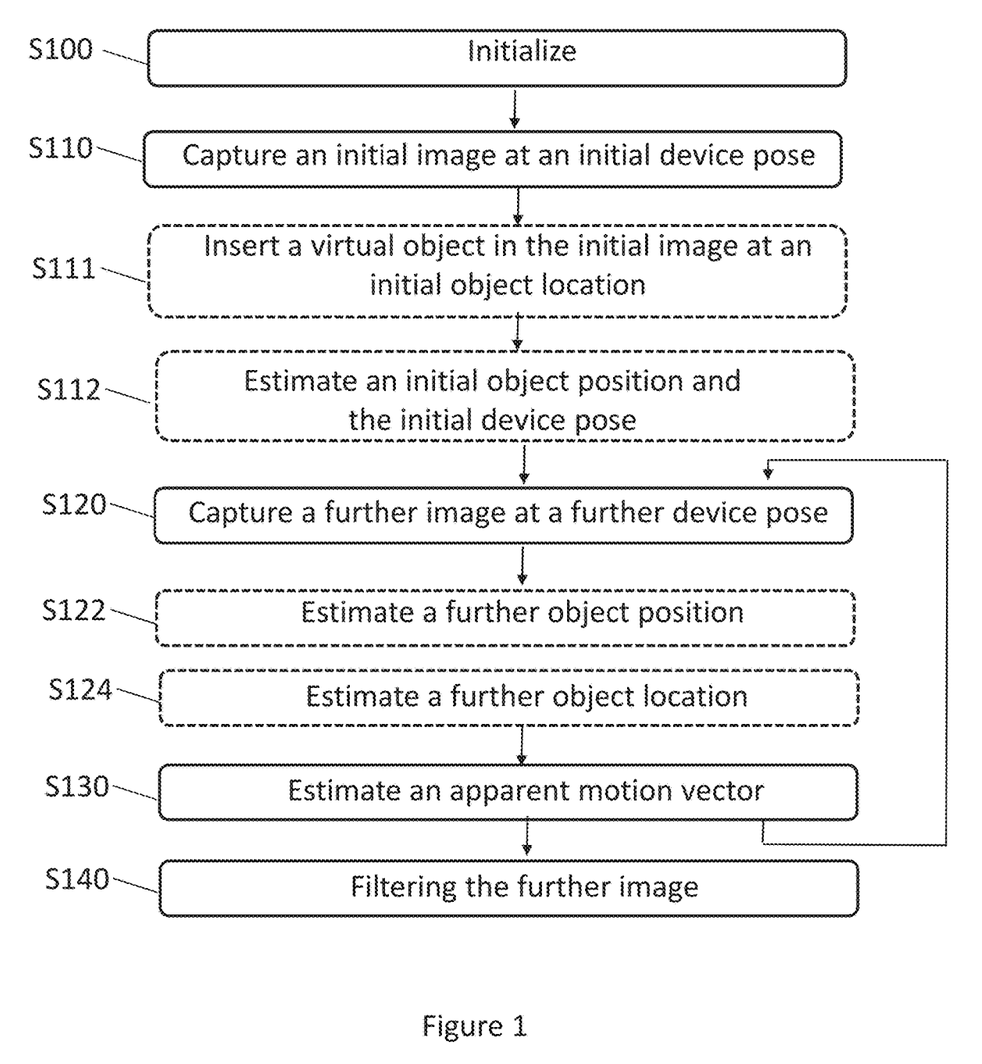
FIG. 1 illustrates the method for blurring a virtual object in a video according to a specific and non-limiting embodiment.
Figure 2:
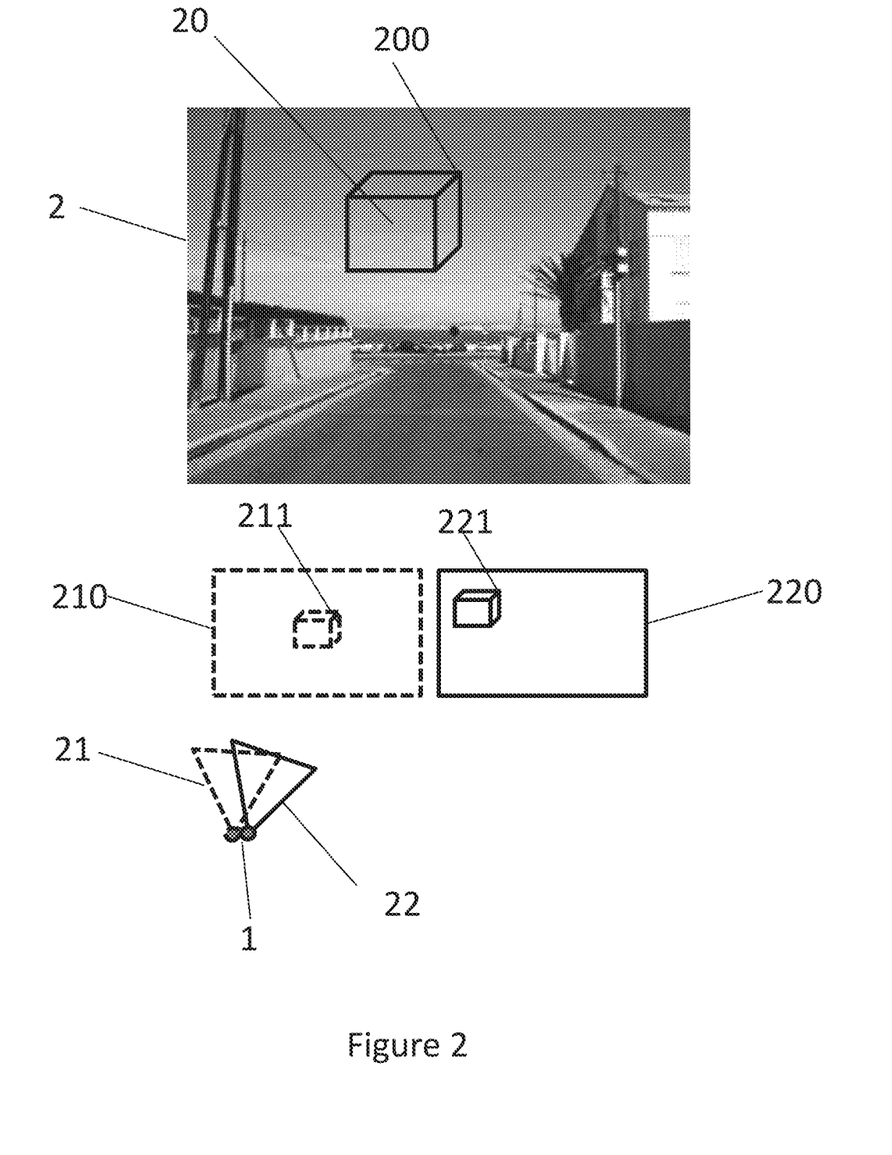
FIG. 2 illustrates an example of capturing a video from a scene and inserting a virtual object according to a specific and non-limiting embodiment.

FIG. 1 illustrates the method for blurring a virtual object in a video according to a specific and non-limiting embodiment. FIG. 1 is further described in relation to FIG. 2, illustrating an exemplary video capture and a virtual object 20 insertion according to a specific and non-limiting embodiment. For the sake of clarity and without limitation, the method is described as implemented in a camera capturing a video of a scene 2. But any other implementation for example in a smartphone or a tablet embedding a camera adapted to capture a sequence of images is compatible with the disclosed principles. Throughout the rest of the description, the general term of device 1 will be used for the capturing device. The scene 2 is to be understood as a real scene and the captured video of that real scene is a sequence of images from that real scene using state of the art video capture components.

In the step S100, the device 1 is initialized. Without limitation, device initialization comprises various steps of hardware and software initialization of the device 1. Device initialization also comprises the various steps preceding a video capture, such as for example positioning and orienting the device 1 at the right place with respect to the scene, adjusting camera parameters, such as for example, the focus, the zoom, and the aperture.

In the step S110, an initial image 210 is captured by the device 1, as the device 1 is at an initial device pose 21. Without limitation, a device pose in a three dimensional space, includes a position and an orientation in that space. The position defines where the device is located and the orientation defines how it is rotated. More generally throughout the description and for the sake of clarity, the term pose designates a position of the device/object in a three-dimensional space, while the term location designates a two dimensional location of a point/vertex in an image.

In the step S120, a current image 220 is captured by the device 1, as the device 1 is at a current device pose 22. Without limitation, the disclosed principles assume the device motion during the video capture is approximated by a pure rotation. Such approximation is reasonable as it corresponds to a wide range of videos captured by people with hand-held cameras. For the sake of clarity and without limitation, the method is described between an initial image captured at an initial device pose, and a current image captured at a current device pose, the virtual object being inserted in the current image. But the method is applicable all along the video, between the various images of the video sequence. For example, the method is also applicable between the initial image and a preceding image, following an iterative process. Moreover, any variant for sampling the video sequence in order to determine the initial image and the current image is applicable to the disclosed principles: in a first example, every captured image of the video sequence is processed by the method as the current image, relative to the preceding image of the video sequence. In a second example of a video sampling, only one every two or three or any other number of images is processed as the current image, relative to a preceding image of the video sequence.

Figure 3:
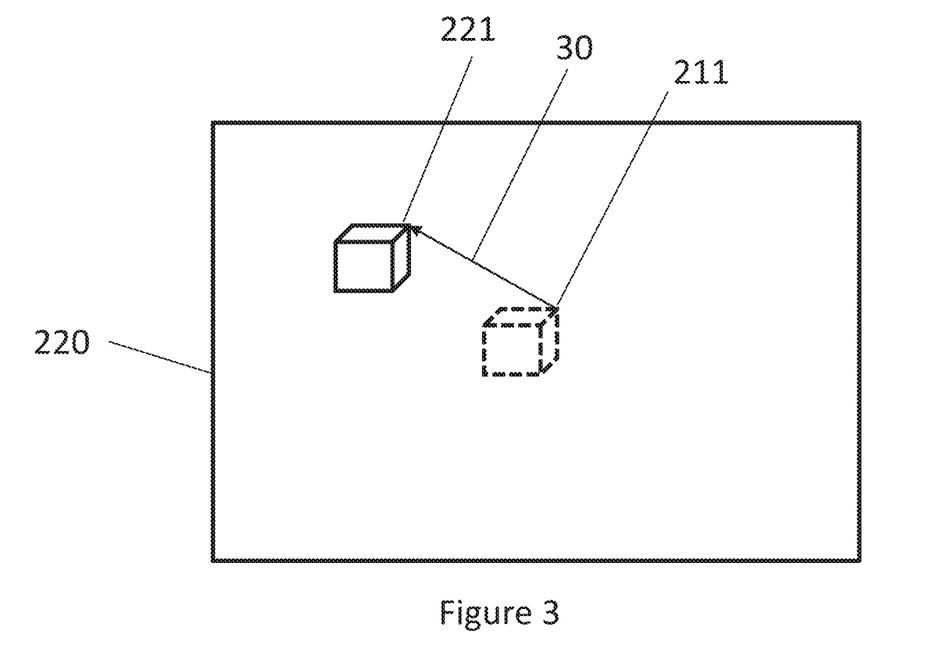
FIG. 3 represents an apparent motion vector according to a specific and non-limiting embodiment.

In the step S130 an apparent motion vector 30 of an inserted virtual object 20 is estimated. An example of the apparent motion vector 30 between the current image 220 and the initial image 210 is illustrated in FIG. 3. The apparent motion vector 30 is defined as a difference of image locations between an area of the current image 221 and an area of the initial image 210 wherein both areas correspond to the same portion of the inserted virtual object. For example, as illustrated by FIGS. 2 and 3, the virtual object 20 comprises a vertex 200 corresponding to a 3D point of the virtual object 20. As the virtual object 20 is inserted in the current image 220, the projection of the vertex 200 in the current image 220 corresponds to an image point, situated at a location 221 in the current image 220. The vertex 200 of the virtual object 20 is associated with the current object location 221 in the current image 22. FIG. 2 and FIG. 3 also illustrate the initial image 210 comprising the initial object location 211 associated with the vertex 200 of the virtual object 20 inserted in the initial image 210. FIG. 3 illustrates the apparent motion vector 30 at the current image 220. The apparent motion vector 30 between the current image 220 and the initial image 210 is the difference between the current object location 221 and the initial object location 211, wherein the initial object location 211 and the current object location 221 are associated with the same vertex 200 of the virtual object. For the sake of clarity and without limitation, the method is described using the example of a vertex 200, corresponding to a point and associated to image locations 211, 221 respectively in the images 210, 220, but any other variants, for example using regions, or clouds of points of the virtual object 20 are compatible with the disclosed principles.

According to a particular embodiment, the device 1 comprises an Inertial Measurement Unit (IMU), using a combination of accelerometers and gyroscopes for measuring and reporting at least angular rates of the device 1. The motion of the device 1 is obtained from data generated by the embedded IMU of the device 1, as for example the device 1 moves from the initial pose 21 to the current pose 22. For the sake of clarity and without limitation, the method is described based on a motion between the initial device pose 21 and the current device pose 22, but any other means for sampling the motion is compatible with the disclosed principles. For the sake of clarity and without loss of generality, the terms "inertial sensor" or "IMU (Inertial Measurement Unit)" are used to describe sensors adapted to measure and report a motion of a device. Any motion sensor, adapted to measure and report a motion of a device, such as for example an angular rate, is compatible with the disclosed principles.

Estimating the apparent motion vector 30 comprises estimating the current device pose 22 based on the initial device pose 21 and on the motion of the device 1 from the initial device pose 21 to the current device pose 22, the motion being obtained for example from data generated by the IMU of the device 1. More formally we note:

$^{c}M_{0}(t-1)$ the 4×4 matrix corresponding to the initial device pose 21, at time (t−1), for example as a rotation translation transformation between the device coordinate system and the world coordinate system (WCS);

$^{i}M_{c}$ the 4×4 matrix corresponding to the rigid transformation from the IMU coordinate system to the device coordinate system (CCS), and $^{c}M_{i}$ its inverse;

$^{i}M_{i}(t)$ the 4×4 rotation matrix estimated from the data returned by the IMU at instant t, corresponding to the change of orientation computed between t−1 and t. For example, gyroscopes, embedded in the IMU provide a triplet of raw values that are further converted in angular velocity, being a vector, whose direction denotes the rotation direction and magnitude denotes the rotation velocity in rad/s. Integration over a desired time interval gives axis-angle representation of the rotation which is then converted in rotation matrix using Rodrigues formula.

$^{c}M_{0}(t)$ the 4×4 matrix corresponding to the current device pose 22, at time (t) for example as a rotation translation transformation between the device coordinate system and the world coordinate system (WCS); The current device pose 22, $^{c}M_{0}(t)$ is computed as follows:

$$^{c}M_{0}(t) = {^{c}M_{i}} *{^{i}M_{i}(t)} *{^{i}M_{c}} *{^{c}M_{0}(t-1)}.$$

The rigid transformation ($^{i}M_{c}$ and $^{c}M_{i}$) between the device and the inertial sensor is for example estimated according to the method described by Jorge Lo and Jorge Dias in "Relative Pose Calibration between visual and inertial sensors", published in the International Journal of Robotics Research in June 2007.

According to the equation, the current device pose 22, noted $^{c}M_{0}(t)$ is estimated from the initial device pose 21, noted $^{c}M_{0}(t-1)$ and from the motion of the device 1, being obtained from data generated by the embedded IMU, as the device 1 moves from the initial device pose 21 to the current device pose 22.

Stationary Virtual Object

According to a first embodiment, the virtual object 20 being inserted in the video is a stationary virtual object. The virtual object has no motion relative to the scene. In the step S130, the apparent motion vector 30 is obtained from data generated by the embedded IMU of the device 1, as for example the device 1 moves from the initial device pose 21 to the current device pose 22. As the virtual object 20 is stationary with regards to the captured scene, the apparent motion vector only depends on the motion of the capturing device. Moreover, as the motion of the device during the video capture is approximated by a pure rotation, the entire, but approximated motion of the device can be obtained from angular rate data generated by the IMU of the device 1. Approximating the motion by a pure rotation and ignoring device translations is furthermore advantageous as it allows ignoring the distance between the stationary virtual object and the device pose for estimating the apparent motion vector: there is indeed no need, in that case to have a three-dimensional knowledge of the virtual object for blurring its insertion, according to the disclosed principles. Indeed, the apparent motion vector 30 is obtained by estimating the current device pose 22 based on the initial device pose 21 and the motion of the device 1 as previously described. Contrary to the second embodiment (described later), determining the current object location 221, does not require knowledge of a position of the virtual object 20 in a three-dimensional space relative to the device 1. The current object location 221 is obtained directly from an initial object location 211 and the apparent motion vector 30, being obtained from data generated by the embedded IMU. Various variants for determining the initial object location will be described later In the step S140, at least a part of the current image 220 is filtered based on the apparent motion vector 30. More precisely a spatial filter is determined based on the apparent motion vector 30. The spatial filter is for example a Gaussian filter. In another advantageous example the spatial filter is a rectangular filter. Using a rectangular filter is advantageous as it corresponds to the physics of the image capture: a window being open during a time period, and the light going through the window during that time interval being averaged. More precisely the estimated apparent motion vector 30 is used to determine filter parameters that will create the blurring effect. These filter parameters comprise a filter length 401 and a filter direction 400, as illustrated on FIG. 4. These filter parameters are directly linked to the apparent motion vector 30 module and direction. The filter direction 400 is the direction of the apparent motion vector 30. The filter length 401, to be applied to a pixel 40 of the inserted virtual object is a multiplicative factor of the module of the apparent motion vector 30, at the corresponding object location, and corresponds to a number of neighboring pixels to be averaged. In the example illustrated in FIG. 4, the length 401 of the filter corresponds to three pixels, represented by three points 41, 42, 43. The multiplicative factor is for example the shutter aperture duration. More formally, considering for example a rectangular window filter with a length L, L is defined by:

$L(p) = \|\vec{d}(p)\| \cdot \tau$, where $\tau$ is the shutter aperture duration and $\|\vec{d}(p)\|$ is the module of the apparent motion vector 30, defined in a number of pixels, measured between the initial image 210 and the current image 220, $\tau$ being a portion of the time interval between the initial image 210 and the current image 220. The direction of the filter is the direction of apparent motion vector $\vec{d}(p)$.

Figure 4:
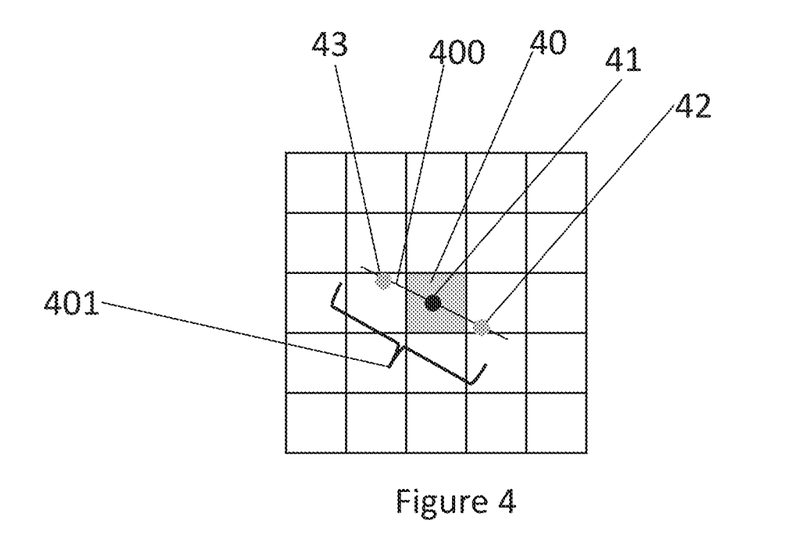
FIG. 4 represents an example of filtering for blurring a virtual object in a video according to a specific and non-limiting embodiment.

In case the shutter aperture duration $\tau$ is unknown but fixed, it is estimated from an off-line calibration process, comprising rotating the mobile device in front of a calibration pattern with straight edges, capturing images of this pattern and analyzing the ramp of these edges in the images. The multiplicative factor of the filter length 401 is obtained from estimating the slope of the ramp.

Filtering S140 at least a part of the current image 220 further comprises obtaining a mask of the virtual object 20 for the current image 220, wherein the mask comprises a non-null color value and a weight value of one for each pixel of the current image corresponding to the virtual object. In other words, the mask comprises only data related to the virtual object to be inserted, and no data related to the real scene. The pixels of the mask which belong to the virtual object have a color value of the virtual object and a weight of one. Other pixels have a weight of zero. The mask is spatially filtered according to the determined spatial filter for both the color values and the weight values. The resulting blurred current image is obtained by blending the current image 220 with the spatially filtered mask of the virtual object 20.

FIG. 4 further illustrates the spatial filtering process, applied to a pixel 40 of the mask. For example, the pixel 40 corresponds to the current object location 221. The filter is drawn from the center 41 of the pixel 40 in the direction 400 corresponding to the apparent motion vector direction. The filter length 401 obtained from the apparent motion vector module, as previously described is three pixels in the illustrated example. Points 42 and 43 are located at an equal distance from the center 41 of the pixel 40, wherein the equal distance corresponds to an inter pixel distance. The color and weight values of the neighboring pixels at the points 42 and 43 are interpolated from further neighboring pixel values based on a bilinear filtering. The color value and the weight value of the pixel 40 are filtered by for example averaging the interpolated color and weight values of neighboring pixels at the points 42 and 43. In a variant, the filter masks are limited to a set of orientations, for example 4 orientations: horizontal, vertical and 2 diagonals. In this variant, the filter masks, i.e. the weights of the involved pixels, are advantageously precomputed.

The filtered current image is then displayed on a display means, so that the user is able to visualize the blurring effect of the virtual object being generated thanks to the previously described principles.

Moving Virtual Object Along a Trajectory

According to a second embodiment, the virtual object 20 being inserted in the video has a trajectory in the scene. For example, the trajectory is a pre-defined 3D trajectory. Advantageously the trajectory of the virtual object 20 is further taken into account for a better estimation of the apparent motion vector 30. Accordingly, in an optional step S122, a current object position is estimated based on the trajectory and on an initial object position, wherein both the initial and the current object positions correspond to a location in a three-dimensional space of a same vertex of the virtual object. The difference between the initial and the current object position is given by the trajectory of the virtual object.

In an optional step S124, a current object location in the current image is estimated from a projection of the current object position in the current image, wherein the current object location is associated with the vertex of the virtual object. More precisely, for each subsequent instant t, given the pre-defined trajectory of the virtual object in the World Coordinate System (WCS), centered on the first position of the virtual object along the trajectory, the current object position is computed as a set of 3D coordinates (X(t), Y(t), Z(t)), which are then projected onto the current image plane, in order to deduce the current object location as a set of 2D coordinates (x(t), y(t)) corresponding to the virtual object insertion.

More formally, given $X(t)=(X(t), Y(t), Z(t))^T$ the 3D coordinates of the vertex of the virtual object relative to the world coordinate system at instant t, we are interested in the locations in the images to which the 3D point projects as a function of time. Under perspective projection and given the intrinsic and extrinsic device 1 parameters, the homogeneous point $X=(X, Y, Z, 1)^T$ projects to the image point $p=(x, y)^T$ given by $$\begin{cases} x = \left(\frac{Q_x}{Q_w} * 0.5 + 0.5\right) * w \\ y = \left(\frac{Q_y}{Q_w} * 0.5 + 0.5\right) * h \end{cases}$$

where w and h are the viewpoint width and height, and the point
$Q=(Q_x, Q_y, Q_z, Q_w)^T$ is the projection of X in the projection space:
$Q=P*V*X$, with V the world-to-view matrix and P the view-to-projection matrix.

Intrinsic device parameters are obtained from an off-line calibration step of the camera embedded in the device 1. Intrinsic parameters are the parameters of the projection model that links the 3D coordinates of a 3D point in a scene, given in the three-dimensional metric coordinate system attached to the camera, and the 2D coordinates of its corresponding 2D point in the image, expressed in pixels. Extrinsic parameters, representing the pose of the device are obtained based on a preceding pose and a rotation information from the IMU accumulated through time, as described previously. According to different variants, the trajectory of the virtual object is defined as a moving rigid object, or as an articulated object. For example in a first variant, the 3D coordinates (X,Y,Z) representing the current object position are directly obtained from the trajectory data. In a second variant, the 3D coordinates (X,Y,Z) representing the current object position are obtained from a O object-to-world matrix, being part of the trajectory data. In a third variant, the O object-to-world matrix is deduced from a set of trajectory parameters comprising for example a translation and/or rotation and/or a scale.

$$X=O*X_0,$$

where $X_0$ are the homogeneous coordinates of the corresponding vertex of the virtual object in the world coordinate system. No hypothesis is made on any required a priori knowledge of the geometry of the real scene. The world coordinate system is for example centered on the initial device position, or on the initial object position.

According to the second embodiment, wherein the virtual object has a trajectory, the apparent motion vector 30 of the virtual object is estimated from a difference between the current object location (resulting of the projection of the current object position in the current image) and an initial object location in the initial image, the initial object location being associated with the same vertex as the current image location.

According to a particular embodiment, the initial object position and/or the initial object location 211 in the initial image 210 is preconfigured. In case of a stationary object (first embodiment), only the initial object location 211 needs to be preconfigured. It is for example the middle of the initial image 210, or the top right corner of the initial image 210. In a variant, the pre-configured initial object location 211 depends on the virtual object size and/or form. In another variant, the initial object location 211 is obtained from an image processing technique applied to the initial image 210 so as to improve the realism of the virtual object insertion. Image processing techniques are used for example to identify planes or structures in the initial image 210 so as to determine the initial object location 211 in relation to the identified structures. In case of a moving virtual object (second embodiment), the initial object position and the trajectory of the virtual object 20 in a three-dimensional space is also pre-configured. Trajectory is for example a straight line for a flying object. In another example, the trajectory is a falling object with possible rebounds that are also pre-configured and obtained for example from a library of trajectories. Using image processing techniques on the initial image 210 so as to configure the initial object position, the initial object location 211 and the trajectory is compatible with the disclosed principles.

According to another particular embodiment, the virtual object 20 is inserted in the video by a user via a user interface. The object insertion comprises an insertion configuration wherein a vertex 200 of the virtual object 20 is associated by the user via the user interface, with an initial object location 211 in the initial image 210. For example, the user associates the vertex 200 with the initial object location 211 in the initial image 210 by touching with a finger the corresponding area of the initial image 210 being displayed on a touch screen. In another example, the 2D coordinates of the initial object location 211 in the initial image 210 are configured by the user via the user interface. In case of a moving object (second embodiment), the initial object position is further configured by the user via the user interface as for instance a set of 3D coordinates in a three-dimensional space. According to different variants the orientation and/or the scale of the virtual object 20 to insert in the initial image 210 are further configured by the user via the user interface. An object coordinate system (OCS) is attached to the object. The trajectory of the object is further configured in this coordinate system. The time scale of the trajectory is given for a certain field rate and is generally adjustable. In a variant, the trajectory is further configured by the user by for example selecting a trajectory among a set of available trajectories. Any means for configuring a trajectory of the virtual object 20 by a user is compatible with the disclosed principles. Once the initial object position, orientation, and scale of the virtual object 20 are configured for the initial image 210, and by using the intrinsic parameters of the device 1, the initial device pose 21 is estimated from a state of art pose estimation algorithm by using correspondences between 3D coordinates of the virtual object vertices and 2D image coordinates of the projected vertices in the initial image 210. The pose estimation algorithm is for example an iterative method based on Levenberg-Marquardt optimization as the method implemented in OpenCV. In this case the function to be minimized is the re-projection error that is the sum of squared distances between the observed projections (2D image coordinates corresponding to the validated insertion) and the projections of the 3D model vertices into the image plane. Advantageously, the initial device pose 21 is estimated relative to the scene 2 and centered onto the initial object position, being configured by the user.

Figure 5:
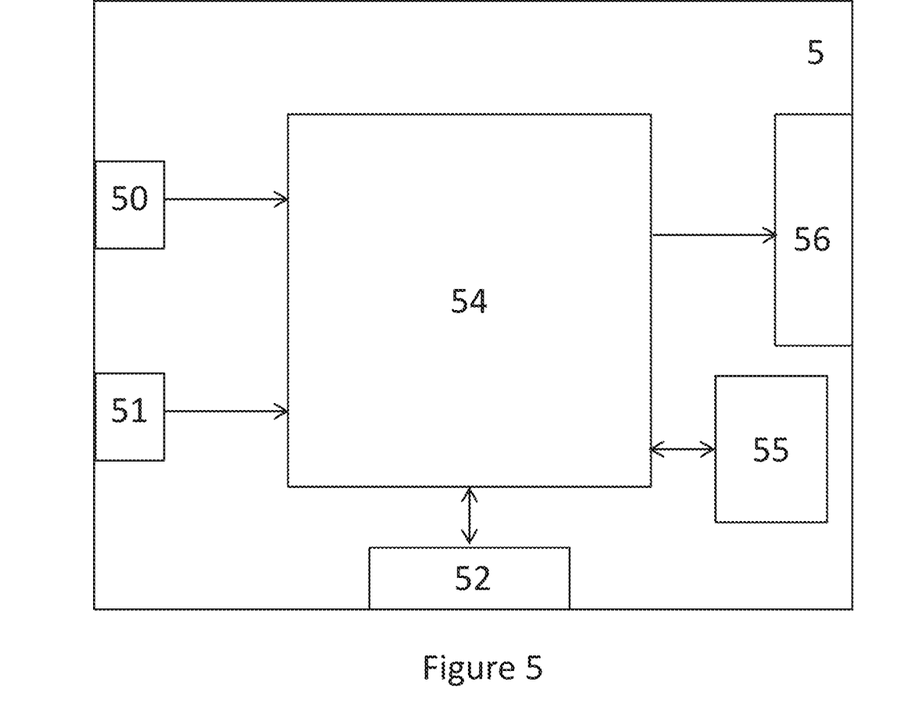
FIG. 5 represents a processing device for blurring a virtual object in a video according to a specific and non-limiting embodiment.

FIG. 5 depicts a processing device 5 for blurring a virtual object in a video, and corresponding to an exemplary implementation of the capturing device 1 of the FIG. 2. According to a specific and non-limiting embodiment of the principles, the processing device 5 comprises a camera 50 configured to capture a video as a sequence of images. According to a specific and non-limiting embodiment of the principles the camera 50 comprises a lens used to focus the light and direct it towards a semi-conductor image capture device, such as for example a CCD (Charge Coupled Device) captor or a CMOS (Complementary Metal Oxide Semiconductor) captor that measures the light with a matrix of thousands or millions of minuscule photo-sensitive diodes called photo-sensitive cells. The camera 50 is configured to capture an initial image and a current image.

According to a particular embodiment of the principles, the processing device 5 further comprises inertial measurement means 51, linked to the processing module 54, configured to measure and report angular rates of the processing device 5. The inertial measurement means comprises for example a combination of accelerometers and gyroscopes, wherein accelerometers are configured to detect a rate of acceleration of the processing device 5, and gyroscopes are configured to detect rotational attributes such as pitch, roll and yaw. According to different embodiments of the principles, the inertial measurement means is a combination of at least:

a linear accelerometer configured to detect and report a rate of acceleration of the processing device 5;

an angular accelerometer configured to detect and report rotational attributes of the processing device 5 such as pitch, roll and yaw;

a gyroscope configured to maintain an absolute angular reference.

More generally any inertial or motion measurement means allowing to measure and report angular rates of the processing device 5 is compatible with the disclosed principles.

The camera 50 and the inertial measurement means are linked to a processing module 54 configured estimate an apparent motion vector of the virtual object between the initial image and the current image. According to a particular embodiment the processing module 54 sends the captured initial image to a local display means 56. The processing module 54 is further configured to filter at least a part of the current image based on the apparent motion vector. According to a particular embodiment the processing module 54 sends the filtered current image to a local display means 56.

According to a particular embodiment the display means is external to the device and the output 56 sends the initial image and the further filtered image to display to an external display mean. According to different embodiments of the invention, the display mean, internal or external, belongs to a set comprising:

A touch screen;
a personal computer screen;
a TV screen;
a tablet;
a smartphone screen.

More generally any display means allowing to display a video with a blurred virtual object is compatible with the disclosed principles.

According to a particular embodiment the processing module 54 sends the captured initial image and the current image to the storage module 55. According to a particular embodiment, the processing module 54 also sends the filtered current image, and more generally the video comprising the blurred virtual object to the storage module 55. According to different embodiments of the principles, the storage module belongs to a set comprising:

a hard disk drive;
a SSD;
a memory;
a writable CD-ROM;
a writable DVD;
a writable Blu-ray disk.

More generally any storage means allowing to store video comprising the blurred virtual object is compatible with the disclosed principles.

According to a specific and non-limiting embodiment of the principles, the processing device 5 further comprises a user interface 52 linked to the processing module 54, and configured to receive configuration data from a user for inserting the virtual object in the initial image. According to a specific and non-limiting embodiment of the principles, the user interface 52 is further configured to receive data for associating a vertex of the virtual object with an initial object location in the initial image as displayed on the display means 56. According to different embodiments of the principles, the user interface 52 belongs to a set comprising:

a touch screen and its accompanying controller based firmware adapted to display images and icons and to receive data from a user interaction with displayed icons;

a network interface such as a local area network interface or a wide area network interface for connecting the processing device 5 to an external device configured to provide a remote user interface to a user.

More generally any device adapted to provide a user interface and to receive configuration data for inserting the virtual object in the initial image, is compatible with the disclosed principles.

Figure 6:
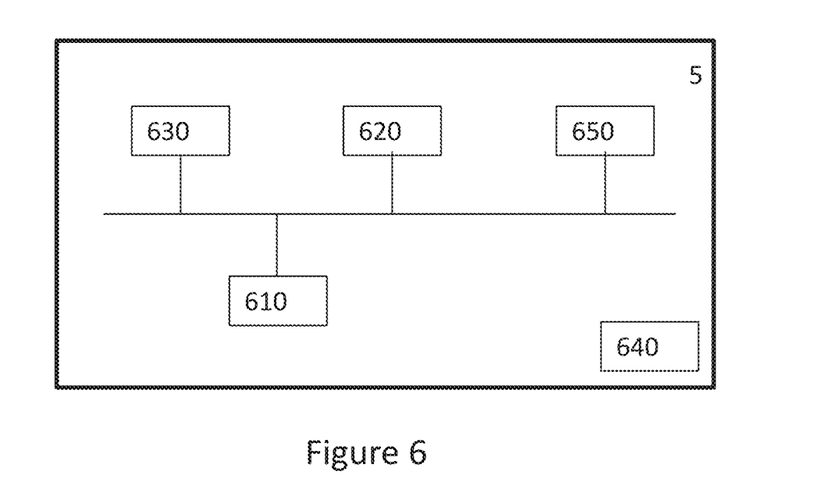
FIG. 6 represents an exemplary architecture of the processing device of FIG. 5 according to a specific and non-limiting embodiment.

FIG. 6 represents an exemplary architecture of the processing device 5 according to a specific and non-limiting embodiment, where the processing device 5 is configured to blur a virtual object in a captured video. The processing device 5 comprises one or more processor(s) 610, which is(are), for example, a CPU, a GPU and/or a DSP (English acronym of Digital Signal Processor), along with internal memory 620 (e.g. RAM, ROM, EPROM). The memory 620 stores the images of the captured video as well as the measured angular rate data, and the filtered current image. The processing device 5 comprises one or several Input/Output interface(s) 630 adapted to send to display output information and/or to allow a user to enter commands and/or data (e.g. a keyboard, a mouse, a touchpad, a webcam, a display), and/or to send/receive data over a network interface; and a power source 640 which may be external to the processing device 5. The processing device 5 comprises one or several Inertial measurement unit 650 (IMU) adapted to detect and report angular rate data of the processing device 5.

According to an exemplary and non-limiting embodiment, the processing device 5 further comprises a computer program stored in the memory 620. The computer program comprises instructions which, when executed by the processing device 5, in particular by the processor 610, make the processing device 5 carry out the processing method described with reference to FIG. 1. According to a variant, the computer program is stored externally to the processing device 5 on a non-transitory digital data support, e.g. on an external storage medium such as a SD Card, HDD, CD-ROM, DVD, a read-only and/or DVD drive and/or a DVD Read/Write drive, all known in the art. The processing device 5 thus comprises an interface to read the computer program. Further, the processing device 5 could access one or more Universal Serial Bus (USB)-type storage devices (e.g., "memory sticks.") through corresponding USB ports (not shown).

According to exemplary and non-limiting embodiments, the processing device 5 is a device, which belongs to a set comprising:

a camera;
a smartphone;
a tablet;
a portable game device;
a HMD (head mounted device);
smart glasses.

The invention claimed is:

1. A method comprising:
obtaining an initial image of a video captured by a device at an initial device pose;
obtaining a current image of said video captured by the device at a current device pose;
estimating an apparent motion vector of a virtual object between said initial image and said current image, based on an angular rate associated with at least one motion sensor of said device moving from said initial device pose to said current device pose,
wherein said estimating is performed independent of any translation of said device moving from said initial device pose to said current device pose and independent of a distance between the virtual object and the current device pose; and blurring the virtual object based on said apparent motion vector.

2. The method according to claim 1, wherein said estimating said apparent motion vector further comprises estimating said current device pose, based on said initial device pose and on said angular rate.

3. The method according to claim 1, further comprising estimating a current object location in said current image based on said apparent motion vector and on an initial object location in said initial image.

4. The method according to claim 3, further comprising:
inserting said virtual object in said initial image, from a user interface, said inserting comprising associating a vertex of said virtual object with said initial object location in said initial image; and
estimating said initial device pose related to said initial object position corresponding to said initial object location.

5. The method according to claim 1, wherein said virtual object has a trajectory, said method further comprising:
estimating a current object position based on said trajectory and an initial object position; and
estimating a current object location in said current image based on a projection of said current object position in said current image.

6. The method according to claim 5, wherein estimating said apparent motion vector of said virtual object is based on a difference between said current object location in said current image and an initial object location in said initial image.

7. The method according to claim 1, wherein said blurring said virtual object further comprises filtering the virtual object based on a spatial filter length and a spatial filter direction, said spatial filter direction corresponding to a direction of said apparent motion vector, and said spatial filter length being a factor of a module of said apparent motion vector, said spatial filter length corresponding to a number of neighboring pixels.

8. The method according to claim 7, wherein said factor corresponds to a shutter aperture duration of said device.

9. The method according to claim 7, wherein said filtering the virtual object further comprises:
obtaining a mask of said virtual object for said current image,
wherein the mask comprises non-null color values and a weight value of one for pixels of said current image corresponding to said virtual object;
spatially filtering said mask according to said spatial filter; and
blending the current image with the spatially filtered mask of the virtual object.

10. The method according to claim 1, further comprising estimating said initial device pose based on a preceding image being captured by said device at a preceding device pose, said estimating said initial device pose being further based on said preceding device pose and a preceding motion of said device from said preceding device pose to said initial device pose.

11. A device comprising:
a processor configured to:
obtain an initial image of a video captured by a camera at an initial device pose;
obtain a current image of said video captured by the camera at a current device pose;

estimate an apparent motion vector of a virtual object between said initial image and said current image, based on an angular rate associated with at least one motion sensor indicating motion of the camera moving from said initial device pose to said current device pose,
wherein said estimating is performed independent of any translation of said device moving from said initial device pose to said current device pose and independent of a distance between the virtual object and the current device pose; and
blur the virtual object based on said apparent motion vector.

12. The device according to claim 11, wherein the processor is further configured to estimate said current device pose, based on said initial device pose and on said angular rate.

13. The device according to claim 11, further comprising the camera and the motion sensor.

14. The device according to claim 11, wherein the processor is further configured to estimate a current object location in said current image based on said apparent motion vector and on an initial object location in said initial image.

15. The device according to claim 14, wherein the processor is further configured to:
insert said virtual object in said initial image, from a user interface, said inserting comprising associating a vertex of said virtual object with said initial object location in said initial image; and
estimate said initial device pose related to said initial object position corresponding to said initial object location.

16. The device according to claim 11, wherein the processor is further configured to estimate said initial device pose based on a preceding image being captured by said device at a preceding device pose, said estimating said initial device pose being further based on said preceding device pose and a preceding motion of said device from said preceding device pose to said initial device pose.

17. The device according to claim 11,
wherein the processor is further configured to obtain a mask of said virtual object for said current image, and
wherein the mask comprises non-null color values and a weight value of one for pixels of said current image corresponding to said virtual object, said virtual object being blurred based on said mask.

18. The device according to claim 17, wherein the processor is further configured to filter the mask based on a spatial filter length and a spatial filter direction, said spatial filter direction corresponding to a direction of said apparent motion vector, and said spatial filter length being a factor of a module of said apparent motion vector, said spatial filter length corresponding to a number of neighboring pixels.

19. The device according to claim 18, wherein the processor is further configured to blend the current image with the spatially filtered mask of the virtual object.

20. A non-transitory computer-readable storage medium comprising program code instructions executable by a processor for:
obtaining an initial image of a video captured by a device at an initial device pose;
obtaining a current image of said video captured by the device at a current device pose;
estimating an apparent motion vector of a virtual object between said initial image and said current image, based on an angular rate associated with at least one motion sensor of the device moving from said initial device pose to said current device pose, wherein said estimating is performed independent of any translation of said device moving from said initial device pose to said current device pose and independent of a distance between the virtual object and the current device pose; and blurring the virtual object based on said apparent motion vector.

21. The non-transitory computer-readable storage medium according to claim 20, further comprising program code instructions executable by a processor for estimating a current object location in said current image based on said apparent motion vector and on an initial object location in said initial image.

22. The non-transitory computer-readable storage medium according to claim 21, further comprising program code instructions executable by a processor for:

inserting said virtual object in said initial image, from a user interface, said inserting comprising associating a vertex of said virtual object with said initial object location in said initial image; and estimating said initial device pose related to said initial object position corresponding to said initial object location.

23. The non-transitory computer-readable storage medium according to claim 20, further comprising program code instructions executable by a processor for estimating said initial device pose based on a preceding image being captured by said device at a preceding device pose, said estimating said initial device pose being further based on said preceding device pose and a preceding motion of said device from said preceding device pose to said initial device pose.

24. The non-transitory computer-readable storage medium according to claim 20, further comprising program code instructions executable by a processor for obtaining a mask of said virtual object for said current image, wherein the mask comprises non-null color values and a weight value of one for pixels of said current image corresponding to said virtual object, said virtual object being blurred based on said mask.

25. The non-transitory computer-readable storage medium according to claim 24, further comprising program code instructions executable by a processor for filtering the mask based on a spatial filter length and a spatial filter direction, said spatial filter direction corresponding to a direction of said apparent motion vector, and said spatial filter length being a factor of a module of said apparent motion vector, said spatial filter length corresponding to a number of neighboring pixels.

26. The non-transitory computer-readable storage medium according to claim 25, further comprising program code instructions executable by a processor for blending the current image with the spatially filtered mask of the virtual object.

* * * * *